A. E. SMITH.

Carriage-Axle.

No. 6,695. Reissued Oct. 11, 1875.

Attest:
Jos. S. Coombs
A. H. Norris.

Inventor:
Alfred E. Smith
By James L. Norris
Atty.

N. PETERS, PHOTO-LITHOGRAPHER, WASHINGTON, D. C.

UNITED STATES PATENT OFFICE.

ALFRED E. SMITH, OF BRONXVILLE, NEW YORK, ASSIGNOR TO FRANK D. SLOAT, OF MIDDLETOWN, CONNECTICUT.

IMPROVEMENT IN CARRIAGE-AXLES.

Specification forming part of Letters Patent No. 98,436, dated December 28, 1869; reissue No. 3,991, dated May 24, 1870; reissue No. 6,695, dated October 11, 1875; application filed July 8, 1875.

DIVISION B.

*To all whom it may concern:*

Be it known that I, ALFRED E. SMITH, of Bronxville, in the county of Westchester, State of New York, have invented certain Improvements in Journals for Wheels, of which the following is a specification, reference being had to the accompanying drawings, in which—

Figure 1:
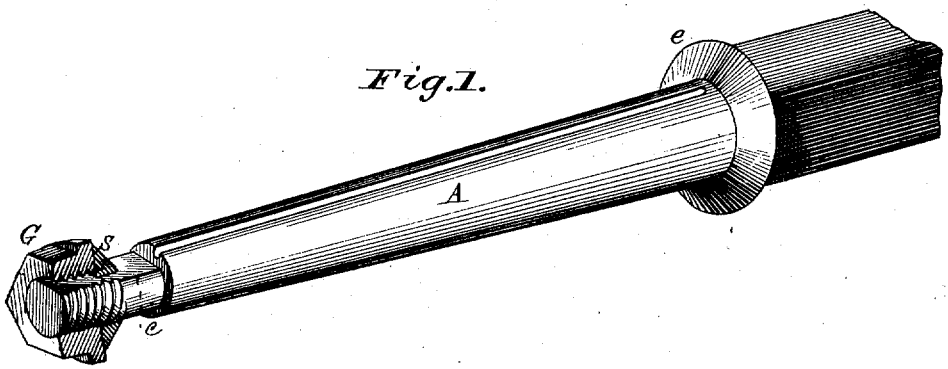
Figure 2:
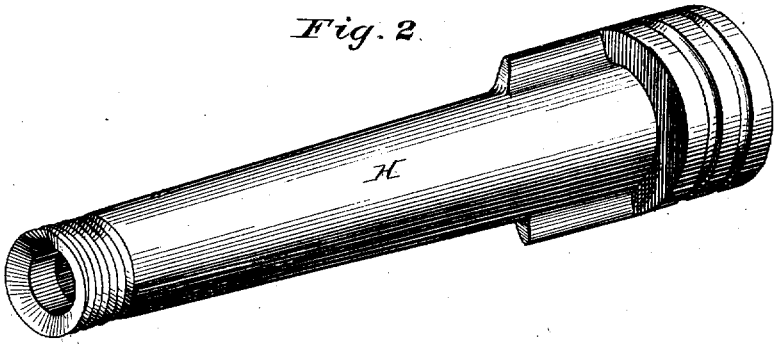
Figure 3:
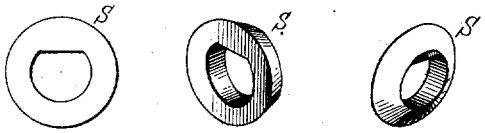

Figure 1 is a perspective view of the journal, the wheel, or the box on which the wheel is placed, being removed. Fig. 2 is a perspective view of the box, upon which the wheel may be placed, if desired, the spindle or journal being removed. Fig. 3 comprises a front view and two views, in perspective, of the follower-nut.

My invention relates to certain improvements in journals, whereby the noise and rattling of the parts, and the swaying of the wheel from side to side, caused either by an imperfect fitting of the parts or by their gradual destruction by wear, are effectually avoided.

My invention consists in providing one end of the journal with a screw-thread, to receive an ordinary screw-nut, a conical follower being placed loosely upon the spindle in front of said screw-nut, by which said follower is adjustable in a line parallel with the axis of the journal. This conical follower is placed upon the journal with its inclined face toward the wheel, and the hub of the latter, or the end of the axle-box, is inwardly beveled at an angle corresponding with that given to the face of the follower. At the opposite end of the journal a similar conical collar is formed, and a corresponding bevel may also be given to the end of the wheel-hub or axle-box, which abuts against it.

The interior diameter of the wheel or box being slightly greater than the diameter of the journal, it will be seen that the bearing-points, to some extent, will be upon the inclined faces of said follower and collar; and as these bearing-surfaces may be caused to approach each other by screwing up the nut at the end of the journal, a solid journal-bearing is formed, all noise and rattling of the parts may be prevented, and the wear of the bearing may be easily compensated.

In the drawings, A represents the fixed journal, having a screw-thread formed at one end, to receive a nut, G. In front of this nut is placed a metallic conical follower, S. This follower is provided with a polygonal-shaped bore, to correspond with the flattened nib *c* of the journal, to prevent said follower from revolving with the wheel. The flat face of the follower lies squarely against the inner face of the nut G, and its inclined or conical surface is presented to the wheel-hub or to the end of the axle-box. H in Fig. 2 shows an ordinary box, which may be placed upon the journal between said journal and the hub of the wheel. The end of this box is inwardly beveled to fit the inclined face of the follower S, and the opposite end of the box is also beveled inwardly in a similar manner to fit a conical collar or shoulder.

The box H being somewhat greater than the diameter of the journal, the said wheel-box, instead of revolving directly on the journal, will, to some extent, revolve upon the incline faces of the follower S and collar *e*.

By means of the screw-nut G it is evident that the conical follower can be adjusted toward the conical collar or shoulder in such a manner that the journal-bearing shall be solid, noiseless, and easily compensated for the wear of the parts.

Having thus described my invention, what I claim, and desire to secure by Letters Patent, is—

1. A journal provided at one end with a compensating-follower having a conical bearing-surface, and at the other with a conical collar, each adapted to fit a corresponding seat formed in the ends of the bearing-box, said follower being constructed to be advanced along the journal to compensate for lateral wear, substantially as described.

2. A journal having a compensating-follower provided with a conical bearing-surface and an internal polygonal bore, in combination with a screw-threaded nut abutting against said follower, and serving to adjust the latter upon the polygonal-shaped seat on the journal, substantially as described.

In testimony that I claim the foregoing I have hereunto set my hand this 17th day of February, A. D. 1875.

ALFRED E. SMITH.

Witnesses:

CHARLES L. BARRITT,
THOS. M. PELL.